Patented Feb. 17, 1953

2,628,896

UNITED STATES PATENT OFFICE 2,628,896

SILICON NITRIDE ABRASIVES

Hendrik de W. Erasmus, Lewiston, and William D. Forgeng, Niagara Falls, N. Y., assignors to Union Carbide and Carbon Corporation, a corporation of New York No Drawing. Application February 23, 1949, Serial No. 77,993

4 Claims. (Cl. 51—298)

This invention relates to improved abrasives comprising silicon nitride, to a method for making such improved abrasives, and to a novel method for abrading articles by rubbing them with the novel abrasive material.

We have found that silicon nitride is superior to silicon carbide and alumina for abrading material from hard substances such as cast iron, cobalt-chromium-tungsten alloys, synthetic sapphire crystals, and others.

The silicon nitride can be prepared in any suitable way, as by nitriding of silicon at a high temperature, or by the reaction of silicon tetrachloride with ammonia followed by calcining. Silicon nitride as produced is a finely-divided unbonded chemically inert powder having a fineness between about 0.02 and about 20 microns. This powder has been used alone in an unbonded condition for polishing or lapping cast iron, cobalt-chromium-tungsten alloy, and synthetic sapphire. The samples were polished more rapidly and effectively than when silicon carbide and alumina were used.

Silicon nitride also has been prepared as a compact solid bonded abrasive and used effectively as a whetstone for abrading hard materials. One procedure for bonding together the particles of powder involved compressing the powder into a solid pellet at a pressure of 10,000 pounds per square inch, and then sintering the pellet at a temperature between 1400° and 1900° C. No binder was used. The bonded product, having silicon nitride exposed upon its surface, was used successfully for abrading glass, quartz, and topaz.

Another procedure for preparing a compact solid bonded abrasive from silicon nitride powder is to mix the nitride with a suitable bonding agent such as silicate of soda, shellac, rubber, a resinoid such as a phenol formaldehyde synthetic resin, clay, or feldspar so that the bonding agent becomes dispersed between the particles of the nitride and holds them together. The mix is then molded to any desired shape, as to the shape of a grinding wheel, and is cured to secure a tight bond between the particles of the nitride (as is well known in the art of manufacturing grinding wheels). An abrasive containing a rubber binder is cured by vulcanization; abrasives containing clay or feldspar are cured by vitrification at a high temperature; abrasives containing the other named binders are cured by baking at moderate temperatures.

Silicon nitride also can be applied to a base, such as a thin solid flexible sheet of paper or cloth, and used successfully as a superior polishing tool. The surface of the cloth or paper is coated with a suitable adhesive binder such as glue and particles of finely-divided silicon nitride powder are embedded in the adhesive while the latter is still soft. Upon hardening of the binder the particles of silicon nitride are firmly held on the paper or cloth.

What is claimed is:

1. An abrasive product comprising a solid base having a surface coating of adhesive material thereon, and a plurality of finely-divided particles of silicon nitride embedded in said coating and bonded thereby to said base.

2. An abrasive product comprising a thin solid flexible sheet having a surface coating of adhesive material thereon, and a plurality of finely-divided particles of silicon nitride embedded in said coating and bonded thereby to said base.

3. A compact solid abrasive consisting essentially of finely-divided particles of silicon nitride as the abrading material and a different solid bonding material dispersed between said particles of silicon nitride and holding said particles together, said bonding material being selected from the group consisting of silicate of soda, shellac, rubber, a resinoid, clay, and feldspar.

4. A method of making an abrasive which comprises bonding finely-divided abrasive particles consisting essentially of silicon nitride together with a different bonding material dispersed between said particles, said different bonding material being selected from the group consisting of silicate of soda, shellac, rubber, a resinoid, clay, and feldspar.

HENDRIK de W. ERASMUS.
WILLIAM D. FORGENG.

REFERENCES CITED

The following references are of record in the file of this patent:

UNITED STATES PATENTS

| Number | Name | Date |
|--------|------|------|
| 866,444 | Egly | Sept. 17, 1907 |
| 928,476 | Sindig-Larsen | July 20, 1909 |